Feb. 5, 1957 R. W. JENSEN 2,780,413
PNEUMATIC TEMPERATURE CONTROL
Filed June 8, 1953 2 Sheets-Sheet 1
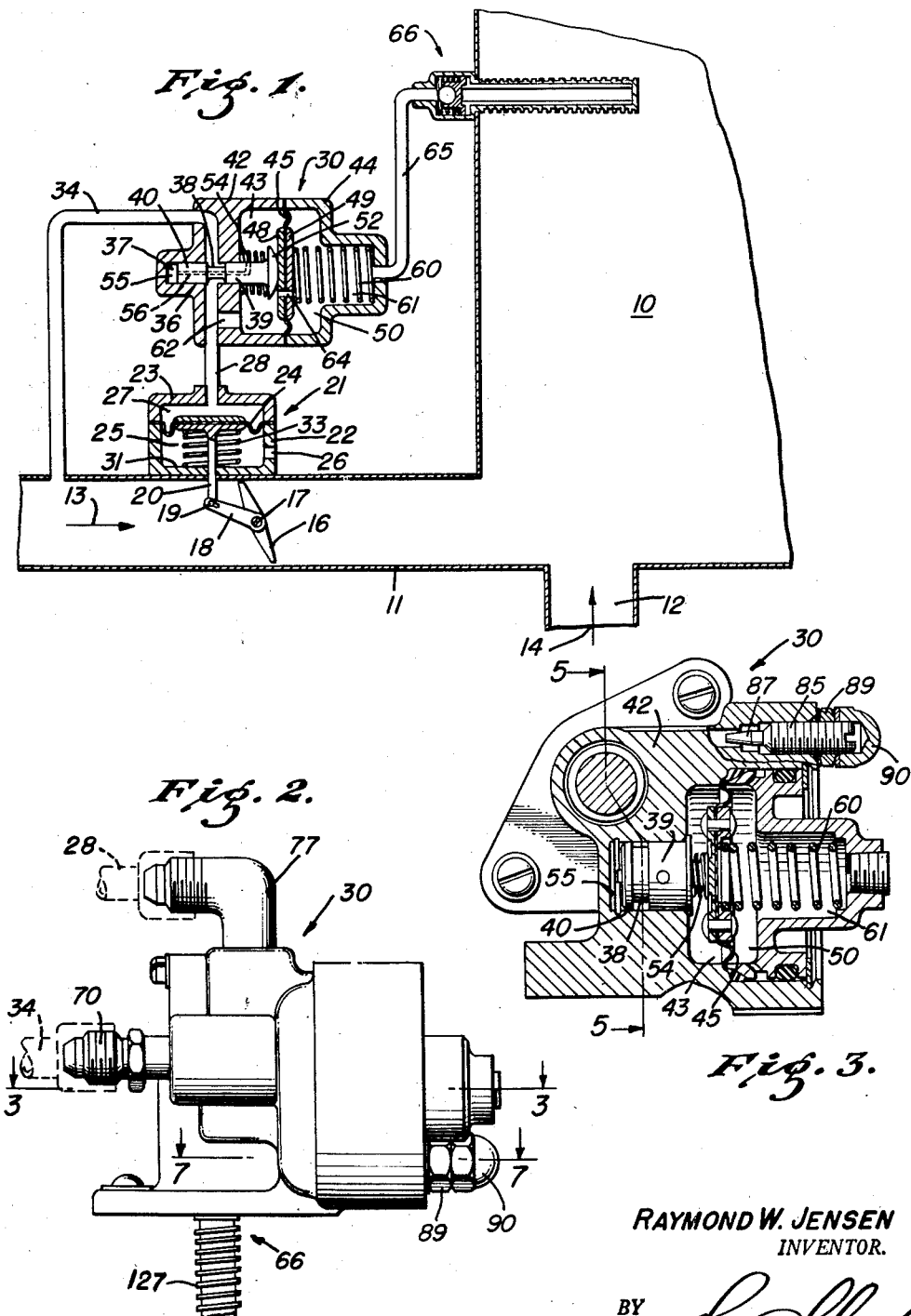
RAYMOND W. JENSEN
INVENTOR.
BY
ATTORNEY Feb. 5, 1957  R. W. JENSEN  2,780,413
PNEUMATIC TEMPERATURE CONTROL
Filed June 8, 1953  2 Sheets-Sheet 2
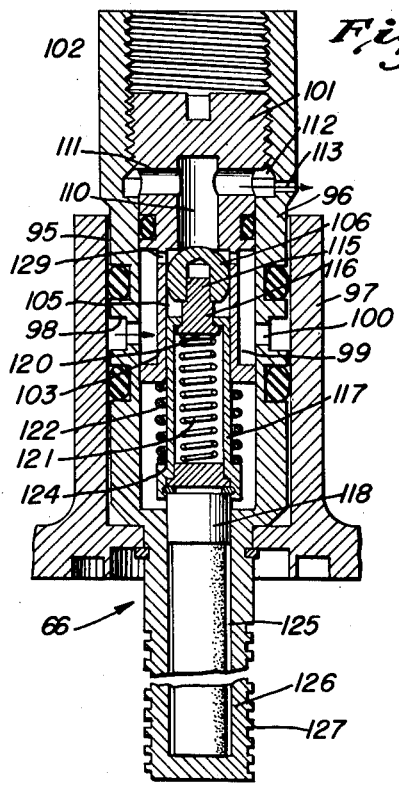
Fig. 4.
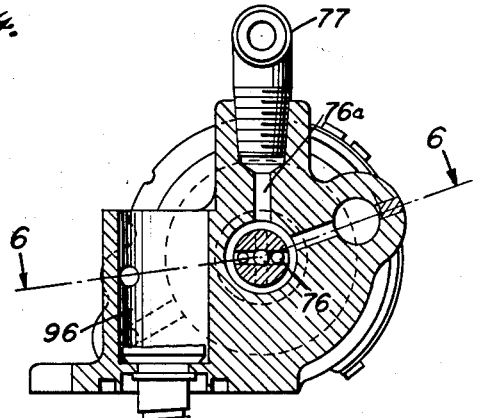
Fig. 5.
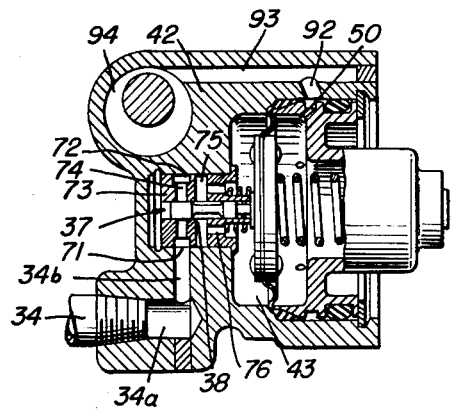
Fig. 6.
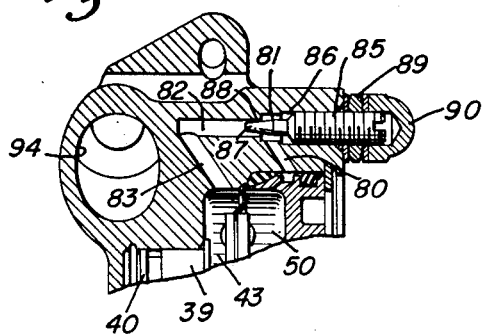
Fig. 7.
RAYMOND W. JENSEN
INVENTOR.
BY 
ATTORNEY United States Patent Office 2,780,413
Patented Feb. 5, 1957

2,780,413

PNEUMATIC TEMPERATURE CONTROL

Raymond W. Jensen, Encino, Calif., assignor to The Garrett Corporation, Los Angeles, Calif., a corporation of California Application June 8, 1953, Serial No. 360,066

12 Claims. (Cl. 236—13)

This invention relates generally to fluid control means and relates more particularly to fluid temperature control means.

While the invention may be utilized in various types of installations, it is shown and described herein as utilized to regulate the temperature of air which may be used for various purposes.

It is an object of the present invention to provide means for controlling the temperature of such air by mixing hot and cold air to provide an air mixture of the desired temperature.

Another object of the invention is to provide thermopneumatic control means.

Still another object of the invention is to provide means of this character which controls the mixing of such hot and cold air in accordance with the temperature of the air mixture.

A further object of the invention is to provide means of this character which is reliable, stable, accurate and efficient in its functioning, and is compact in construction, relatively light in weight and relatively inexpensive to manufacture.

Other objects and advantages of the invention will appear in the following part of the specification.

Referring to the drawings, which are for illustrative purposes only:

Fig. 1 is a diagrammatic view of apparatus embodying the present invention;

Fig. 2 is an exterior view showing a unit embodying said invention;

Fig. 3 is a sectional view taken on line 3—3 of Fig. 2;

Fig. 4 is a sectional view through the thermostatic unit showing certain details of construction;

Fig. 5 is a sectional view taken on line 5—5 of Fig. 3;

Fig. 6 is a sectional vew taken on line 6—6 of Fig. 5; and

Fig. 7 is a fragmentary sectional view taken on line 7—7 of Fig. 2.

Referring to Fig. 1, there is shown an enclosure 10 which is supplied with air by means of conduits 11 and 12, the direction of airflow being indicated by the respective arrows 13 and 14. The enclosure is supplied with cool air from the conduit 12 which is supplied from any suitable source, it being noted that conduit 12 is freely open to airflow therethrough at all times. In order to condition the air in the enclosure 10, hot air at a relatively high pressure derived from any suitable source, is introduced by means of said conduit 11. Airflow through conduit 11 is controlled by a valve 16, said valve being shown as a butterfly valve although any suitable type of valve may be used. Valve 16 has a valve shaft 17 to which one end of an actuating arm 18 is connected, the opposite end of said actuating arm being operably connected at 19 to an actuating rod 20 of an actuator, indicated generally at 21.

The actuator 21 comprises a housing having a lower cup-like shell 22 and an upper cup-like shell 23 facing said shell 22 so as to provide a hollow interior divided by a flexible diaphragm 24 clamped between the free edges of the respective parts 22 and 23. The lower chamber 25 is vented to atmosphere by way of a vent opening 26 while the upper chamber 27 is connected, by means of a conduit 28, with a control or regulating mechanism, indicated generally at 30.

The rod 20 is slidable in an opening provided therefor in the bottom wall 31 of the lower cup-like part 22 and an opening in conduit 11 which is in register with the opening in said bottom wall 31. The rod 20 has a close enough fit with said openings so that there is little or no leakage therepast and a spring 33, disposed in chamber 25, reacts on the diaphragm 24 to urge same in a direction to effect closing of the valve 16.

The regulator 30 is connected, by means of a conduit 34, with the conduit 11 upstream of the valve 16. Conduits 28 and 34 are connected with a bore 36 and the points of opening into said bore 36 are aligned.

Bore 36 slidably receives a valve member, indicated generally at 37, said valve member having an annular groove 38 therein which separates said valve member into an enlarged portion 39 at one side of said groove and an enlarged portion 40 at the opposite side of said groove. The bore 36 is of sufficient length to permit operative movements of the valve member 37, the groove 38 being so positioned as to permit pressure from conduit 11 by way of conduit 34 to be transmitted to the conduit 28 and thence to chamber 27. However, with slidable movement of the valve member 37, the connection between conduit 34 and conduit 28 is controlled, said control being such as to vary the size of said connection and even cut the connection entirely.

The regulator 30 includes a body portion 42 having the bore 36, said body portion also having a chamber 43. There is also a cap or cover 44 which is hollow and has a free edge portion which cooperates with the free edge portion of the body part forming the chamber 43 to clamp a marginal portion of a diaphragm 45 therebetween.

A central area of the diaphragm is clamepd between a pair of reinforcing plates 48 and 49 which are of smaller diameter than the diameter of the chamber 43 and a chamber 50 at the opposite side of the diaphragm from said chamber 43. The diaphragm 45 is adapted to actuate the movable valve member 37 which has a head 52 at the inner end thereof which is urged against the plate 48 by a spring 54 which reacts between the bottom of chamber 43 and said head 52. It is to be noted that the variable chamber 55 at the outer end of the enlarged portion 40 of the valve member 37 is connected to chamber 43 by means of a passage 56 so that said valve member is balanced with respect to the pressures at opposite ends thereof. This arrangement relieves any undesirable pressure condition in chamber 55 which might interfere with the proper operation of the mechanism. The valve member 37 is urged to the left, as shown in Fig. 1, by a spring 60 which reacts between the diaphragm 45 and the bottom of a reduced diameter portion 61 of the cover 44. Chamber 43 is connected to conduit 28 by means of a passage 62 and there is bleed means 64 between chamber 43 and chamber 50. Chamber 50 has a connection with atmosphere by way of a conduit 65 and thermostatic control device, or temperature responsive means, indicated generally at 66. The thermostatic control device is subjected to the temperature within the enclosure 10 and is, therefore, responsive to said temperature.

The spring 33 of the actuator 21 yieldingly urges the valve 16 in a closing direction and is adapted to close said valve. The pressure in chamber 27 at the opposite side of the diaphragm from the chamber in which the spring is located, urges the diaphragm in a direction to effect opening movement of said valve 16 against the force of spring 33, and said pressure in chamber 27 is determined by the regulator device 30 as modified by the thermostatic control 66.

High pressure in conduit 11, upstream of valve 16, is transmitted to chamber 27 but is regulated by the valve member 37. Inasmuch as chamber 43 is connected by passage 62, to the conduit 28, said regulated pressure from conduit 28 is effective in chamber 43 to urge the diaphragm 45 to the right, as shown in Fig. 1, so that spring 54 will move the valve 37 to restrict the air pressure transmitted to chamber 27. Pressure in chamber 43 is transferred to chamber 50 through the restricted bleed 64 and the pressure in chamber 50, in conjunction with the effective action of spring 60, tends to move the valve member 37 in the opening direction.

As the temperature responsive means is subjected to the temperature of the air in enclosure 10, the temperature of said air in said enclosure is controlled by the action of said temperature responsive means so as to maintain the desired enclosure temperature.

Referring now to Figs. 2 to 7, the mechanism includes a nipple 70 to which the conduit 34 is connected so that high pressure air passes through a bore 34a and a bore 34b and then to a port 71 and from there into an annular recess 72 in the housing 73 of the pilot valve 37, said housing being disposed in a recess provided therefor in the regulator housing 42. From the annular recess 72, the pressure is transmitted to cross bores 74 in said valve housing for communication with the annular recess 38 in the pilot valve 37. The high pressure air then passes out through radial passages 75 and then through axial passages 76 into the chamber 43. The air from chamber 43 passes to the actuator 21 by way of a passage 76a which communicates with an elbow 77 connected to the conduit 28. The bleed connection 64 between chamber 43 and chamber 50 comprises passage 80, bore 81, reduced diameter bore 82 and passage 83. The effective size of this connection is determined by a needle valve 85 threadably received in an enlarged bore 86 with the tip 87 of said needle valve cooperating with a shoulder 88 at the junction of the bore 81 with bore 82. A lock nut 89 is provided on the threaded portion of valve 85 and a cap nut 90 covers the end of said valve.

Pressure in the chamber 50 is transmitted through the passages 92 and 93 into a chamber 94 which communicates through the space 95 between the body portion 96 of the thermostatic device and the hollow receptacle 97 therefor, into an annular groove 98 which communicates with the interior 99 of the housing 96 by way of cross passages 100. Within the body 96 is a plug 101 which has an externally threaded portion received in the internally threaded bore 102 of said body 96. The plug has guide means 103 disposed in the interior 99 of the body portion 96, said guide means having an axial bore 105 in which is disposed a ball valve 106 which controls communication between the bore 105 and an axial bore 110 in the plug portion 101, said axial bore 110 communicating with cross bore 111 which opens into an annular space 112 having an outlet 113 to atmosphere.

The ball valve member 106 is connected with one end of a carrier 115 which has a portion 116 slidable in an opening provided therefor in a hollow plunger 117 connected to the adjacent end of a rod 118. The carrier 115 has a head 120 which limits outward movement thereof relative to the chamber 117 and is urged outwardly by a spring 121 within said chamber 117. Member 117 is urged outwardly by a spring 122 which reacts against the outer end of guide 103 and a shoulder 124 on the outer end of said member 117. Rod 118 is received in an axial bore 125 in a tubular member 126 which has external fins 127 spaced from each other longitudinally with respect to said tubular member. The coefficient of expansion between the rod 118 and member 126 is different so that operative movements of the rod will be effected to lift the ball valve 106 from its seat and control the flow of air from the device. It is to be noted that there are openings 129 in the guide 103 to provide communication between the interior chamber 99 of the body 96 and the interior portion 105 of the guide between the openings 129 and the entrance to the bore 110.

A similar thermostatic device is disclosed in applicant's copending application Serial No. 304,130 for Temperature Control System and Device filed August 13, 1952.

I claim:

1. Temperature control apparatus for controlling the temperature of air in an enclosure wherein said enclosure has a supply of relatively hot air at relatively high pressure and a supply of relatively cool air, comprising: a valve controlling the supply of hot air to said enclosure; a pressure responsive actuator controlling said valve, said actuator having a diaphragm subjected on one side to ambient pressure; means defining, with said diaphragm, a control pressure chamber, the other side of said diaphragm being subjected to said control chamber pressure, the diaphragm responding to variations in the differential of pressure on the opposite sides thereof; pressure regulating means including a pressure responsive diaphragm responsive to variations in the differential of pressure on the opposite sides thereof; means defining a regulator pressure chamber at one side of the regulator diaphragm; a conduit for connecting the actuator control pressure chamber with the high pressure supply; means connecting said regulator pressure chamber with said conduit; means defining a second regulator pressure chamber at the opposite side of the regulator diaphragm; a restricted connection between said regulator pressure chambers; a valve, including a movable valve member, for controlling said conduit so as to control the pressure to said actuator control pressure chamber and to the first mentioned regulator pressure chamber, the regulator diaphragm being operably connected with said valve member; an outflow passage between the second mentioned regulator pressure chamber and ambient atmosphere; a valve controlling said outflow passage; and temperature responsive means, subjected to the temperature in said enclosure, controlling the last mentioned valve.

2. Temperature control apparatus for controlling the temperature of air in an enclosure wherein said enclosure has a supply of relatively hot air at relatively high pressure and a supply of relatively cool air, comprising: a valve controlling the supply of hot air to said enclosure; an actuator controlling said valve, said actuator having a movable member subjected on one side to ambient pressure; means defining a control pressure chamber, the other side of said member being subjected to said control chamber pressure, and responding to variations in the differential of pressure on the opposite sides thereof; pressure regulating means including a movable pressure responsive wall responsive to variations in the differential of pressure on opposite sides thereof; means defining a regulator pressure chamber at one side of said wall; a conduit for connecting the actuator control pressure chamber with the high pressure supply; means for connecting said regulator pressure chamber with said high pressure supply; means defining a regulator second pressure chamber at the opposite side of said wall; a restricted connection between said regulator pressure chambers; a valve, including a movable valve member, for controlling the pressure to said actuator pressure chamber and to said first mentioned regulator pressure chamber, said wall being operably connected with said valve member; outflow passage means between the second mentioned regulator pressure chamber and ambient atmosphere; a valve controlling said outflow passage means; and temperature responsive means, subjected to the temperature in said enclosure, controlling the last mentioned valve.

3. Temperature control apparatus for controlling the temperature of air in an enclosure wherein said enclosure has a supply of relatively hot air at relatively high pressure and a supply of relatively cool air, comprising: means controlling the supply of hot air to said enclosure, said means including a pressure responsive member subjected to a control pressure; pressure regulating means controlling the value of said control pressure and including a pressure responsive element responsive to variations in the differential of pressure on opposite sides thereof; means defining a regulator pressure chamber at one side of said element; means connecting said regulator pressure chamber with said high pressure supply; means defining a regulator pressure chamber at the opposite side of said element; a restricted connection between said regulator pressure chambers; means connecting the second mentioned regulator pressure chamber with ambient atmosphere; a valve controlling the last mentioned means; and temperature responsive means, subjected to the temperature in said enclosure, controlling said valve.

4. In temperature control apparatus for controlling a supply of air: a valve controlling said air supply; a pressure responsive actuator controlling said valve, said actuator having a diaphragm subjected on one side to ambient pressure; means defining, with said diaphragm, a control pressure chamber, the other side of said diaphragm being subjected to said control chamber pressure, the diaphragm responding to variations in the differential of pressure on the opposite sides thereof; pressure regulating means including a pressure responsive diaphragm responsive to variations in the differential of pressure on opposite sides thereof; means defining a regulator pressure chamber at one side of the regulator diaphragm; a conduit for connecting the actuator control pressure chamber with a high pressure supply; means for connecting said regulator pressure chamber with said high pressure supply; means defining a regulator pressure chamber at the opposite side of the regulator diaphragm; a restricted connection between said regulator pressure chambers; valve means controlling the pressure to the actuator pressure chamber and the first mentioned regulator chamber, the regulator diaphragm being operably connected with said valve member; a passage between the second mentioned regulator pressure chamber and ambient atmosphere; a valve controlling said passage; and temperature responsive means controlling the last mentioned valve.

5. In temperature control apparatus for controlling a supply of air; means, including pressure responsive actuator means controlling said supply of air; pressure regulating means controlling said actuator means and including a pressure responsive element responsive to variations in the differential of pressure on opposite sides thereof; means defining a regulator pressure chamber at one side of said element; means connecting said chamber with a source of operating pressure; means defining a regulator pressure chamber at the opposite side of said element; a restricted connection between said regulator pressure chambers; means connecting the second mentioned regulator pressure chamber with ambient atmosphere; means controlling said connecting means; and temperature responsive means controlling said controlling means.

6. Temperature control apparatus for controlling a supply of air, including: pneumatic means controlling said air supply and adapted to be connected to a source of operating pressure; means controlling said pneumatic means and including a pressure responsive control element; means for subjecting one side of said element to an actuating pressure; means defining a pressure chamber, the opposite side of said element being subjected to the pressure in the second mentioned chamber; means, including temperature responsive means, controlling the flow of fluid relative to the last mentioned chamber; and means controlled by said pressure responsive control element controlling the pressure supplied to said pneumatic means and the pressure to said one side of said element.

7. In means for controlling the temperature of air in an enclosure having a supply of relatively warm air and a supply of relatively cool air from respective warm and cool air sources: pressure responsive valve means controlling the supply from one of said sources; regulator means including a pilot valve controlling the pressure to said pressure responsive valve means, said regulator means also including a pressure responsive control element; means defining a pair of pressure chambers, the opposite sides of said pressure responsive control element being subjected to the pressures in the respective chambers; means for connecting one of said chambers to a source of operating pressure, said pilot valve controlling the connecting means for said one chamber; restricted means interconnecting said chambers; means for connecting the other of said chambers to a region of lower pressure; and temperature responsive means subjected to the air in the enclosure for controlling the connection of said other chamber with said region of lower pressure.

8. In temperature control apparatus: pressure regulating means including a pressure responsive element responsive to variations in the differential of pressure on the opposite sides thereof; means defining a pressure chamber at one side of said element, said chamber having an inlet; means for operably connecting said regulator to a device to be controlled; means defining a second pressure chamber at the opposite side of said element, said passage having an outlet; a connection between said pressure chambers; a control member, for controlling said means for connecting the regulator to said device, said element being operably connected with said member; an outflow passage between the second mentioned regulator pressure chamber and ambient atmosphere; and means, including temperature responsive means, controlling the outlet of said second chamber.

9. In temperature control apparatus: pressure regulating means comprising a housing having a recess therein defining a pressure chamber, and a reduced diameter recess extending from said pressure chamber, there being passages connected with said reduced diameter recess; a pilot valve housing in said reduced diameter recess, said housing having cross bores connected with said passages and longitudinally extending bores, there being an axial bore in said housing; a slidable valve member in said axial bore having parts for controlling the flow of fluid between the cross bores and said longitudinally extending bores, the latter communicating with the said pressure chamber; a diaphragm forming one side of said pressure chamber; yielding means urging the valve member into operable engagement with said diaphragm; a hollow cap marginally engaging said diaphragm and providing therewith a second pressure chamber; a spring urging the diaphragm in a direction to effect opening of communication between the cross bores of said pilot valve housing; passage-way means connecting the said chambers together; a valve for controlling the effective size of said passage-way means; said housing having an outlet for said second chamber; and temperature responsive means, including a valve controlling said outlet and thermostatic means controlling said valve controlling said outlet.

10. In means for controlling the temperature of air in an enclosure having a supply of relatively hot and relatively cool air from respective sources: means, including a pressure responsive device, controlling the supply from one of said sources; regulator means, including a pressure responsive element and a valve controlled thereby for controlling said pressure responsive device; means defining a pair of pressure chambers, the opposite sides of said pressure responsive element being subjected to the pressures in the respective chambers; means for connecting one of said chambers to a source of operating pressure, said valve also controlling said connection; a restricted connection between said chambers; means for connecting the other of said chambers to a region of low pressure; and temperature responsive means subjected to the air in the enclosure for controlling the connection of said other chamber with said region of lower pressure.

11. In control mechanism for controlling a supply of air: means for directly controlling said air supply; regulator means, including a pressure responsive element and a control member controlled by said element for controlling the directly controlling means; means defining a pair of pressure chambers, the opposite sides of said pressure responsive control element being subjected to the pressures in the respective chambers; means for connecting one of said chambers to a source of operating pressure, said control member also controlling the pressure to said one chamber; an inlet passage and an outlet passage for the other of said chambers and temperature responsive means controlling one of said passages.

12. In temperature control apparatus for controlling the temperature of air in an enclosure, supplied with air from a suitable source: means for controlling the supply of air to said enclosure from said source; pressure regulating means, including a pressure responsive element responsive to variations in the differential of pressure on opposite sides thereof; means defining a pressure chamber at one side of said element, said chamber having inlet means; means defining a pressure chamber at the opposite sides of said element; a restricted connection between said pressure chambers; a pilot valve, including a movable valve member, said pressure responsive element having an operable connection with said valve member, said valve member also controlling the first mentioned means; an outlet for the second mentioned pressure chamber; a valve controlling said outlet; and temperature responsive means controlling the last mentioned valve.

References Cited in the file of this patent
UNITED STATES PATENTS

| | | |
|---|---|---|
| 2,029,203 | Soderberg | Jan. 28, 1936 |
| 2,264,261 | Erbgath | Nov. 25, 1941 |
| 2,441,405 | Fitch | May 11, 1948 |
| 2,519,475 | Kennedy | Aug. 22, 1950 |